United States Patent [19]

Wolfkiel et al.

[11] Patent Number: 5,216,602

[45] Date of Patent: Jun. 1, 1993

[54] COLOR IMAGING SYSTEM

[75] Inventors: Christopher J. Wolfkiel; Bruce H. Brundage, both of Wilmette, Ill.

[73] Assignee: The Board of Trustees of the University of Illinois, Urbana, Ill.

[21] Appl. No.: 432,870

[22] Filed: Nov. 6, 1989

[51] Int. Cl.$^5$ .................. G06F 15/00; H05G 1/64
[52] U.S. Cl. ................. 364/413.22; 378/100
[58] Field of Search ........... 364/413.22; 358/81, 358/82, 111, 13, 133, 903; 378/100, 99, 4; 391/131; 340/703, 701

[56] References Cited

U.S. PATENT DOCUMENTS

| 4,398,213 | 8/1983 | Haendle et al. | 358/111 |
|---|---|---|---|
| 4,436,095 | 3/1984 | Kruger | 128/654 |
| 4,437,161 | 3/1984 | Anderson | 364/414 |
| 4,447,827 | 5/1984 | Alexandrescu et al. | 358/111 |
| 4,503,459 | 3/1985 | Haendle et al. | 358/111 |
| 4,504,858 | 3/1985 | Franke | 358/111 |
| 4,536,790 | 8/1985 | Kruger et al. | 358/111 |
| 4,598,368 | 7/1986 | Umemura | 364/414 |
| 4,636,850 | 1/1987 | Stewart | 358/111 |
| 4,658,412 | 4/1987 | Finkler et al. | 378/99 |
| 4,672,650 | 6/1987 | Masanobu | 378/4 |
| 4,672,651 | 6/1987 | Horiba et al. | 378/62 |
| 4,697,594 | 10/1987 | Mayo, Jr. | 128/653 |
| 4,716,904 | 1/1988 | Meno | 128/654 |
| 4,825,390 | 4/1989 | Van Aken et al. | 391/131 |
| 4,907,075 | 3/1990 | Braudaway | 358/81 |
| 4,926,454 | 5/1990 | Haendle et al. | 378/100 |
| 4,998,165 | 3/1991 | Lindstrom | 358/81 |
| 5,027,817 | 7/1991 | John | 364/413.22 |
| 5,042,491 | 8/1991 | Amemiya | 358/81 |

OTHER PUBLICATIONS

H. Toyama, et al., "Color Functional Images of the Cerebral Blood Flow", J. Nucl. Med., vol. 17, No. 11, pp. 953-958, 1976.

M. LeFree, et al., "Digital Goes to the Heart", Diagnostic Imaging, p. 62, Sep. 1983.

K. Gould, et al., "Noninvasive Assessment of Coronary Stenoses by Myocardial Perfusion Imaging During Pharmacologic Coronary Vasodilation. VIII Clinical Feasiblity of Position Cardiac Imaging Without a Cyclotron Using Generator Produced Rubidium-82", J. Am. Coll. Cardiol., vol. 7, No. 4, pp. 775-789, Apr. 1986.

Primary Examiner—Roy N. Envall, Jr.
Assistant Examiner—Xuong Chung
Attorney, Agent, or Firm—Marshall, O'Toole, Gerstein, Murray & Borun

[57] ABSTRACT

An imaging system for producing color images may include a CT scanner having a scanner, a scan memory, a disk memory, a reconstructor and a controller. The CT scanner performs successive scans of a portion of the scanning subject, which may be a living body, and generates scan data for each X, Y portion of each scan. The CT scanner is connected to a controller which may have a microprocessor and one or more memories. The controller generates color image data which includes a color code specifying a particular color for each X, Y portion of the image to be displayed. The color codes are assigned to the X, Y portions of the scans based upon the scan number differences between a first scan of the living body portion and a later scan of the living body portion. A color display is connected to the controller for displaying the colorized images generated.

20 Claims, 10 Drawing Sheets

REFERENCE SCAN NUMBERS

| R(3,0) | R(3,1) | R(3,2) | R(3,3) |
| R(2,0) | R(2,1) | R(2,2) | R(2,3) |
| R(1,0) | R(1,1) | R(1,2) | R(1,3) |
| R(0,0) | R(0,1) | R(0,2) | R(0,3) |

FIG. 5a

CURRENT SCAN NUMBERS

| I(3,0) | I(3,1) | I(3,2) | I(3,3) |
| I(2,0) | I(2,1) | I(2,2) | I(2,3) |
| I(1,0) | I(1,1) | I(1,2) | I(1,3) |
| I(0,0) | I(0,1) | I(0,2) | I(0,3) |

FIG. 5b

SCAN NUMBER DIFFERENCES

| D(3,0) | D(3,1) | D(3,2) | D(3,3) |
| D(2,0) | D(2,1) | D(2,2) | D(2,3) |
| D(1,0) | D(1,1) | D(1,2) | D(1,3) |
| D(0,0) | D(0,1) | D(0,2) | D(0,3) |

FIG. 5c

IMAGE DATA

| C(3,0) | C(3,1) | C(3,2) | C(3,3) |
| C(2,0) | C(2,1) | C(2,2) | C(2,3) |
| C(1,0) | C(1,1) | C(1,2) | C(1,3) |
| C(0,0) | C(0,1) | C(0,2) | C(0,3) |

FIG. 5d

COLOR CODE LOOK-UP TABLE

| D(X,Y) | C(X,Y) |
|---|---|
| -10 | $C_{-10}$ |
| -9 | $C_{-9}$ |
| -8 | $C_{-8}$ |
| ⋮ | ⋮ |
| 28 | $C_{28}$ |
| 29 | $C_{29}$ |
| 30 | $C_{30}$ |

COLOR IMAGING SYSTEM

BACKGROUND OF THE INVENTION

The present invention relates to an imaging system which generates colorized images, and more particularly to an imaging system in which the colorized images emphasize the distribution of blood flow within a living body.

Imaging systems of the type described herein may be used in various medical applications. One such application may utilize a CT (computed tomography) scanner for the detection of infarctions in the myocardium, or heart tissue. In this application, the CT scanner generates successive images of a person's heart after an injection of an indicator, such as contrast medium, to detect the amount of indicator, and hence the distribution of blood present during each successive scan. The images produced are black and white, with the gray-level intensity being generally proportional to the amount of indicator present. By comparing the successive images, general information concerning blood flow can be obtained. For example, areas of the image that did not change in gray-level intensity would indicate that there was no change in blood flow.

However, the analysis of multiple gray-level images is laborious and time consuming. Also, due to the difficulty in discerning subtle differences in close shades of gray, it may be difficult to derive meaningful information from the images produced by the CT scanner.

SUMMARY OF THE INVENTION

The present invention relates to an imaging system which produces colorized images which greatly enhance the visual display, for example, of blood flow within a living body. The invention may be used in connection with a scanner, which may be a CT scanner or a magnetic resonance imaging scanner for example, that generates a set of scan data for each of a plurality of successive scans of the living body portion Each set of scan data may include a scan number for each of a plurality of X, Y portions of the scan. Each scan number is generally proportional to the amount of indicator, and hence blood, present at its associated X, Y scan portion within the living body portion Color image data is generated from the scan data by first determining the difference between the scan number generated for each X, Y portion of one of the scans and the scan number generated for each corresponding X, Y portion of another of the scans. After the scan number differences are determined, a particular color code is assigned to each X, Y portion of an image to be displayed based upon the magnitude of the scan number difference. The image of the living body portion is then displayed based upon the color codes assigned to the X, Y portions of the image.

The invention may include a blanking feature which causes certain areas of the colorized image that is to be displayed to be blanked out. The image portions that are blanked out are those portions from which the change in the scan number from the reference scan to a subsequent scan exceeds a predetermined difference. These areas are blanked out because they do not contain useful information concerning flow perfusion.

These and other features and advantages of the present invention will be apparent to those of ordinary skill in the art in view of the detailed description of the preferred embodiments, which is made with reference to the drawings, a brief description of which is provided below.

BRIEF DESCRIPTION OF THE DRAWINGS

FIGS. 5a through 5d illustrate portions of various two dimensional, data arrays used in the preferred embodiments of the invention;

FIG. 7 illustrates a portion of a color code look-up table 300 which may be used by any of the color coding routines of FIGS. 4a-4c.

DETAILED DESCRIPTION OF THE PREFERRED EMBODIMENTS

Figure 1:
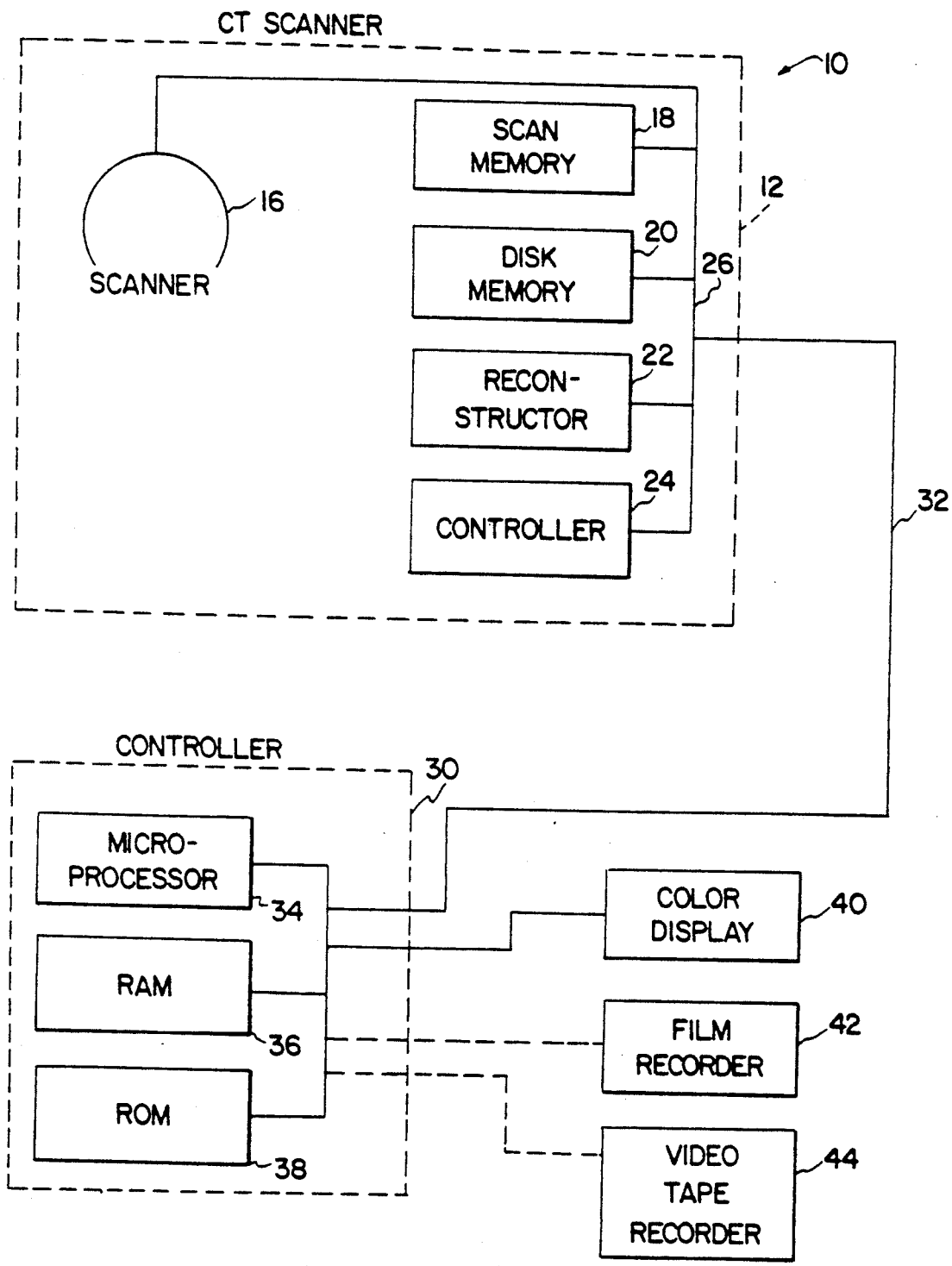
FIG. 1 is a block diagram of electronics of the preferred embodiment of the invention.

One embodiment of an imaging system 10 in accordance with the invention is shown in FIG. 1. The imaging system 10 includes a CT scanner 12 comprising a scanner 16, a scan memory 18, a disk memory 20, a reconstructor 22, and a controller 24, which are all interconnected by a conventional data bus 26. The scanner 16 includes a rotating source (not shown) of radiation, for example X-rays, and a relatively large number of radiation detectors (not shown), for example 400, for detecting the amount of radiation that passes through the person being scanned, or scanning subject. The scanning subject may also be an animal, such as when scanning is performed for experimental purposes, for example.

During operation, the scanner 16 performs a preprogrammed scanning sequence which comprises a number of successive scans of a portion of the subject such as the heart. A typical scanning sequence may comprise a total of 20 scans of the portion, each scan being EKG-gated such that every other heartbeat triggers a scan. The entire duration of the scanning sequence might range from 20 to 40 seconds.

Prior to the initiation of the scanning sequence, a vein of the subject is typically injected with a contrast medium having increased X-ray absorption, such as organically bound iodine atoms, to enhance the images produced by the CT scanner 12. The contrast medium becomes dispersed evenly throughout the blood, and thus the amount of contrast medium present in the area within the subject being X-rayed is generally proportional to the amount of blood present. The scanning sequence begins soon after the subject is injected, for example, five seconds after injection.

During each scan of the scanning sequence, the output of each of the radiation detectors is continuously read and stored in the scan memory 18. Thus, for each scan, the scan memory 18 stores a set of scan data comprising a plurality of scan numbers or signals corresponding to each of the radiation detectors, the scan signals being proportional to the amount of radiation detected by the associated radiation detectors.

The scan data stored in the scan memory 18 is then transmitted to the reconstructor 22 for reconstruction in a conventional manner to form scan data comprising a scan number or signal associated with each X, Y portion of the scan. For example, where the image is to be displayed on a portion of a cathode ray tube (CRT) display having a width of 100 pixels and a height of 100 pixels, each X, Y portion of the scan may correspond to a respective single pixel of the CRT portion, and in this case there would be 100 * 100, or 10,000 signals, each of the signals being representative of the intensity of the X-rays detected by radiation detectors at each of the 10,000 X, Y portions of the scan.

The scan signals stored in the reconstructor 22 may be binary signals having a magnitude ranging from 0 to 2,048. This "reconstructor range" is based upon the well known Hounsfield scale, which ranges from −1,000 to +1,048. The magnitude of the scan signals generated varies depending upon the type of tissue through which the X-rays pass. Scan signals corresponding to X-rays that passed through heart tissue have a magnitude that varies generally from −20 to +50 on the Hounsfield scale. Scan signals corresponding to X-rays that passed through lung tissue have a magnitude that varies generally from −700 to −200 on the Hounsfield scale. The Hounsfield scale is converted to the reconstructor range simply by adding 1,000 to each signal. Thus, the reconstructor range for heart tissue is generally 980 to 1,050, and the reconstructor range for lung tissue is generally 300 to 800.

If the resolution provided by the CT scanner 12 is not high enough, each X, Y portion of the scan could be represented by either four or nine pixels, for example, on a conventional CRT screen. The scan data stored in the reconstructor 22 could be used to generate a black and white image which could be displayed in a conventional manner and interpreted by the scan operator or subsequently by doctors. The black and white image is generated by displaying a particular gray-level intensity at each X, Y portion of the CRT screen, based upon the magnitude of the scan signal corresponding to that X, Y portion. The gray-level intensity displayed at each X, Y CRT portion may be simply proportional to the magnitude of scan signal generated for the corresponding X, Y scan portion.

The disk memory 20 may be used for temporary storage of scan data from the scan memory 18 prior to its being reconstructed by the reconstructor 22. Reconstructed data may also be stored in the disk memory 20 on a relatively long-term basis, such as days or weeks for example. The CT scanner 12 and its components and operation as described above are conventional. The CRT scanner 12 may be a Model C-100 ultrafast scanner commercially available from Imatron.

The CT scanner 12 is connected to a controller 30 via a conventional data link 32, such as a standard IEEE (Institute of Electrical and Electronic Engineers) 488 parallel data link, for example. The data link 32 transfers to the controller 30 the scan data that was produced by the CT scanner 12. This scan data transfer may take place substantially simultaneously with the scanning or it may occur at a much later time, several days or weeks later, for example. The controller 30 may be a conventional personal computer such as an IBM PC AT having a microprocessor 34, a random-access memory (RAM) 36, a read-only memory (ROM) 38, or it may be a custom designed controller. The controller 30 is connected to a color display 40, which may be a conventional CRT, for purposes of displaying the colorized images generated in accordance with the present invention. Optionally, the controller 30 may be connected to a video tape recorder 42 and/or a film recorder 44 for recording the colorized images generated by the controller 30.

OPERATION

The controller 30 executes a computer program 50 which generates color image data from the scan data generated by the CT scanner 12. The color image data can be used to display colorized images of the scanned tissue. The image data is generated by comparing the scan data corresponding to an initial reference scan with the scan data corresponding to each scan subsequent to the reference scan. The specific manner in which this is accomplished is described in detail below.

Figure 2:
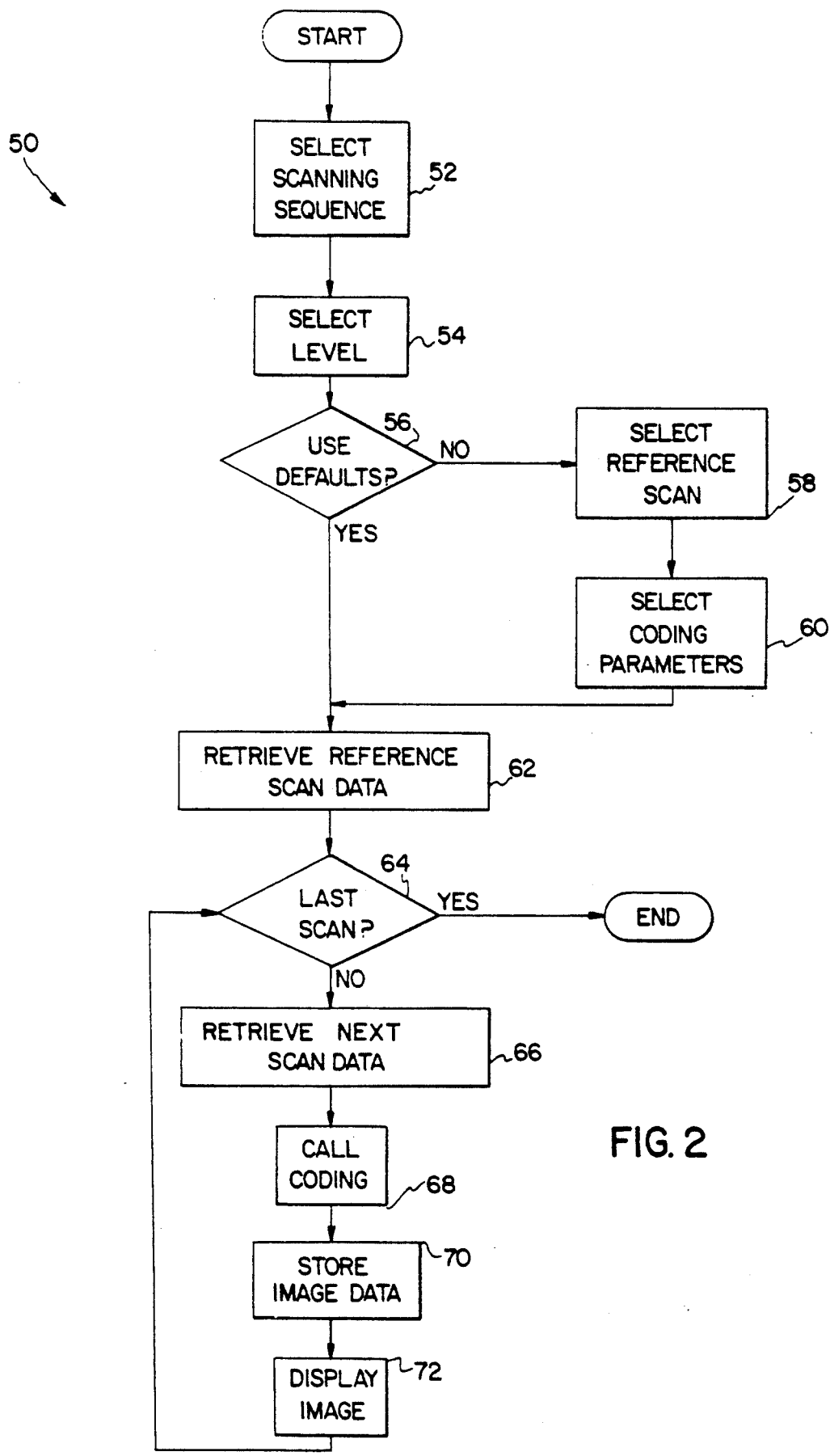
FIG. 2 is a flow chart of the main computer program executed by the controller 30 of FIG. 1.

A flow chart of the computer program 50 is shown in FIG. 2. This flow chart describes the operation of the system after the CT scanner 12 has performed the scanning sequence for which a colorized image is to be generated and displayed. At step 52, the scanning operator or doctor selects the scanning sequence to be analyzed. Typically, each patient or subject will have one or more associated scanning sequences. The scan data generated during the selected scanning sequence may be transferred to the controller 30 from the CT scanner 12 via the data link 32, or it may be transferred by floppy disk, for example, if a data link is not used.

After the scanning sequence is selected, the program branches to step 54 at which point the operator selects the desired scanning level of the selected scanning sequence. The scanning level refers to the tissue level or "slice" to which the scan data relates. CT scanners may scan four different levels within a portion of tissue, each of the levels being spaced about one centimeter apart, for example. Thus, by having two-dimensional scan data for a plurality of different tissue levels, essentially three-dimensional scan data is available. If, four scan levels were used by the CT scanner, the operator may choose which of those four levels to analyze.

At step 56, the operator may decide either to use the default operation of the routine 50 or to customize the operation. In, the latter case, the program branches to step 58 at which point the reference scan is selected. As described above, the scanning sequence comprises a plurality of successive scans. The reference scan is defined by default as the first scan in the scanning sequence. The operator may wish to use a scan other than the first scan, such as the second or third scan in the scanning sequence. For example, using the first scan in the scanning sequence may be undesirable if the scanning subject moved during that scan as a result of being startled by the start of operation of the CT scanner 12.

Figure 3A:
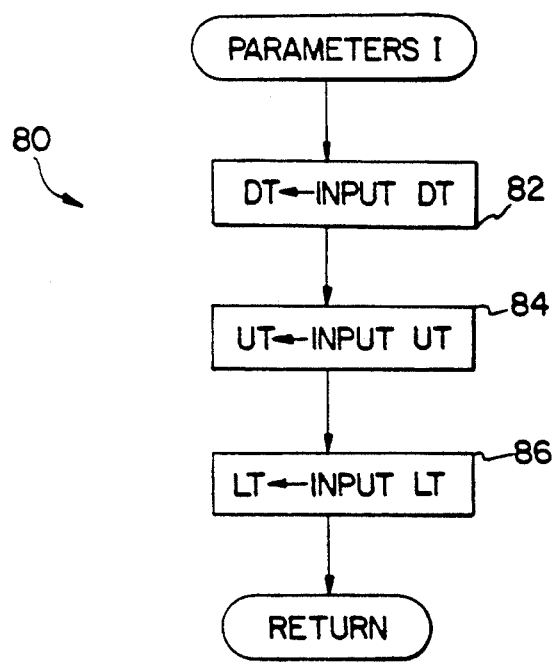
FIG. 3a is a flow chart of a first select parameters routine 80 which may be utilized during the step 60 of the flow chart of FIG. 2.

After the reference scan is selected, the program branches to step 60 at which point the color coding parameters are selected by the operator. The color coding parameters determine how a particular image or set of images will be colorized. The operator has three basic options with respect to the coding parameters that can be selected. A first select parameters routine 80, referred to as PARAMETERS I, is shown in FIG. 3a. If this option is selected, at steps 82–86 the operator is prompted for the desired values of a predetermined difference threshold DT, an upper threshold UT, and a lower threshold LT. These three values are used to determine whether a particular X, Y portion of an image is to be colorized as described in more detail below.

A second select parameters routine 90, PARAMETERS II, prompts the operator for the desired values of the variables DT, UT, and LT at steps 92, 94, and 96, respectively, as described above in connection with FIG. 3a. At steps 98 and 100, the operator is prompted for the values of two variables A and B that affect the coloring scheme used. As described in more detail below, each X, Y portion of an image is assigned a particular color- based upon the difference, D(X, Y), between the scan number for the corresponding X, Y portion of the reference scan, R(X, Y), and the scan number for the same X, Y portion of a scan subsequent to the reference scan, I(X, Y). The variables A and B are used to generate a new scan number difference, NEW D(X, Y), from the computed difference D(X, Y). The value of NEW D(X, Y) equals A * D(X, Y)+B, where A and B are the values chosen by the operator during steps 98 and 100, respectively.

Figure 3B:
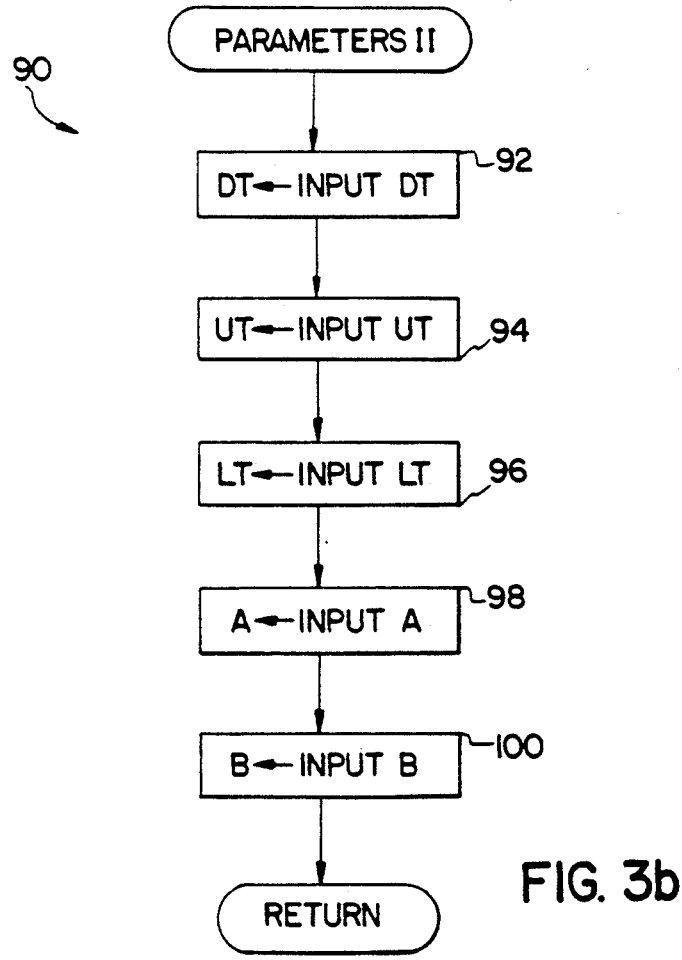
FIG. 3b is a flow chart of a second select parameters routine 90 which may be utilized during the step 60 of the flow chart of FIG. 2.
Figure 3C:
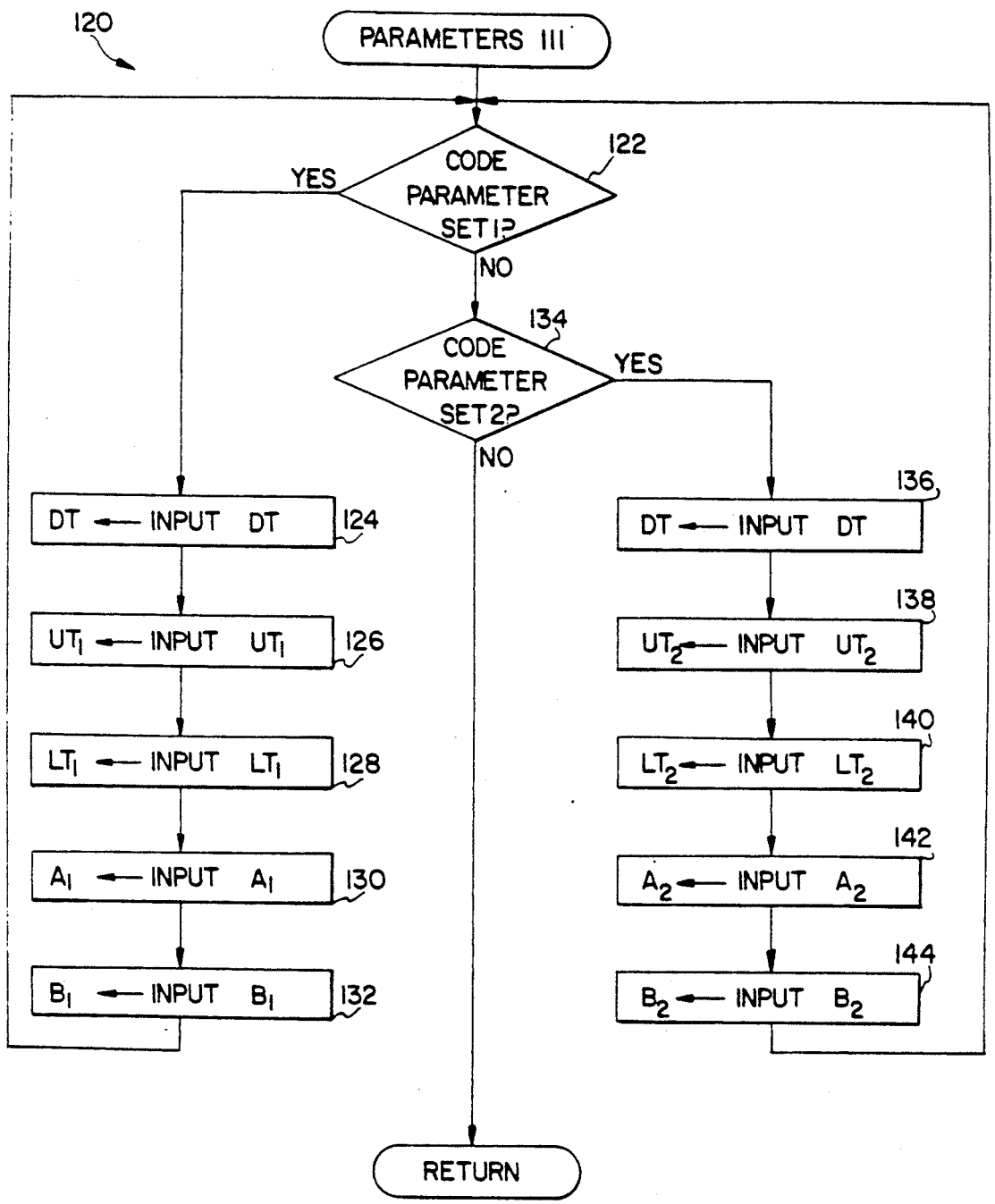
FIG. 3c is a flow chart of a third select parameters routine 120, which may be utilized during the step 60 of the flow chart of FIG. 2.

A third select parameters routine 120, PARAMETERS III, prompts the operator for two different sets of the parameters described above in connection with FIG. 3b. This subroutine 120 may be used where the operator would like colorized images of two disparate tissue types, such as heart tissue and lung tissue, in the same image. In such a case, the first set of parameters is used for the first type of tissue and the second set is used for the second type of tissue. Now referring to FIG. 3c, at step 122 the operator is prompted as to whether he or she wishes to input parameter set 1. If so, the program branches to step 124. At steps 124, 126, 128, 130 and 132, the operator is prompted for and inputs the parameter values DT, $UT_1$, $LT_1$, $A_1$, and $B_1$, respectively. These parameters correspond to the parameters previously described in connection with FIG. 3b. After the completion of step 132, the program branches to step 122, at which point the operator is prompted as to whether he or she wishes to input the first set of parameters.

If the operator is satisfied with the first set of parameters and so indicates, the program branches to step 134 at which point the operator is prompted as to whether he or she wishes to input the second set of parameters. If the second set of parameters is to be entered, the program branches to step 136. At steps 136, 138, 140, 142, and 144, the operator is prompted for and inputs the parameters DT, $UT_2$, $LT_2$, $A_2$, and $B_2$, respectively, and then the program branches to step 122. If all parameters are input to the operator's satisfaction, then the subroutine 120 returns, and the main program branches to step 62 of FIG. 2.

Referring back to FIG. 2, if the operator decides to use the default settings for the controller 30, the program simply branches to step 62, bypassing steps 58, 60. At step 62, the scan data corresponding to the reference scan is retrieved from the memory 36 in the controller 30 and passed to a color coding subroutine, described below, in the form of a two-dimensional array R(X, Y) for use during step 68. A portion of this two dimensional array is shown in FIG. 5a. The X and Y variables refer to the x- and y-coordinates, respectively, in a standard (x, y) coordinate system. For the purposes of the present description, the X, Y position of the lower left-hand corner of both a CT scan and a CRT display is arbitrarily assigned to the coordinate position (O, O). In the case of FIG. 5a, each X, Y portion of the reference scan has a value that may range from 0 to 2,048.

Steps 64–72 comprise the main program loop for producing color image data used to display colorized images in accordance with the present invention. This color image data is generated for each scan performed by the CT scanner 12 subsequent the reference scan. Step 64 determines whether there are additional scans for which color image data is to be produced. If image data has been produced for all of the scans following the reference scan in the scanning sequence, then at step 64 the program ends. If not, the program branches to step 66 where the scan data corresponding to the next scan is retrieved and stored in the two dimensional array I(X, Y) for use during step 68. A portion of this array is shown in FIG. 5b. Each scan subsequent the reference scan will have an associated array of the type shown in FIG. 5b, each value I(X, Y) in the array ranging from 0 to 2,048. If there are twenty scans in the scanning sequence and the first scan is the reference scan, there will be 19 different two dimensional arrays I(X, Y) stored in the memory of the controller 30.

At step 68, the program calls a color coding subroutine which generates color image data from which the colorized image will be displayed. As described in detail below, a number of different color coding algorithms may be used to generate the image data.

After execution of the color coding subroutine, each X, Y portion of the image to be displayed will have been assigned a particular color code representing a particular color. This color image data is stored in a two dimensional array C(X, Y). A portion of such a two dimensional array is shown in FIG. 5d. At step 70 this image data is passed from the color coding routine used during step 68 and stored in the memory 36 in the controller 30. The image data may also be stored in a hard disk memory (not shown) attached to the controller 30. At step 72, a colorized image based upon the image data is displayed on the color display 40, and then the program branches back to step 64 at which point it determines whether there are any additional scans for which image data needs to be generated.

Steps 64–72 are repeated for each scan in the scanning sequence subsequent the reference scan. As a result, color image data is generated for each scan subsequent the reference scan; thus, if there are twenty scans in the scanning sequence and the first scan is the reference scan, 19 C(X, Y) color image data arrays will be generated, and a different color image corresponding to each of these arrays will be displayed during each execution of step 72.

Since the color image data arrays C(X, Y) are stored in the memory of the controller 30, the color images may be displayed in various ways. For example, any particular colorized image could be recalled by the operator for analysis. Alternatively, several colorized images could be displayed simultaneously for comparison. Also, the colorized images could be displayed successively at a relatively rapid rate so as to simulate a movie.

COLOR CODING

The colorized images are produced from color image data comprising a particular color code for each X, Y portion of the image that will be displayed. This color image data may be generated by one of the three color coding routines shown in FIGS. 4a, 4b, and 4c and described below.

Figure 4A:
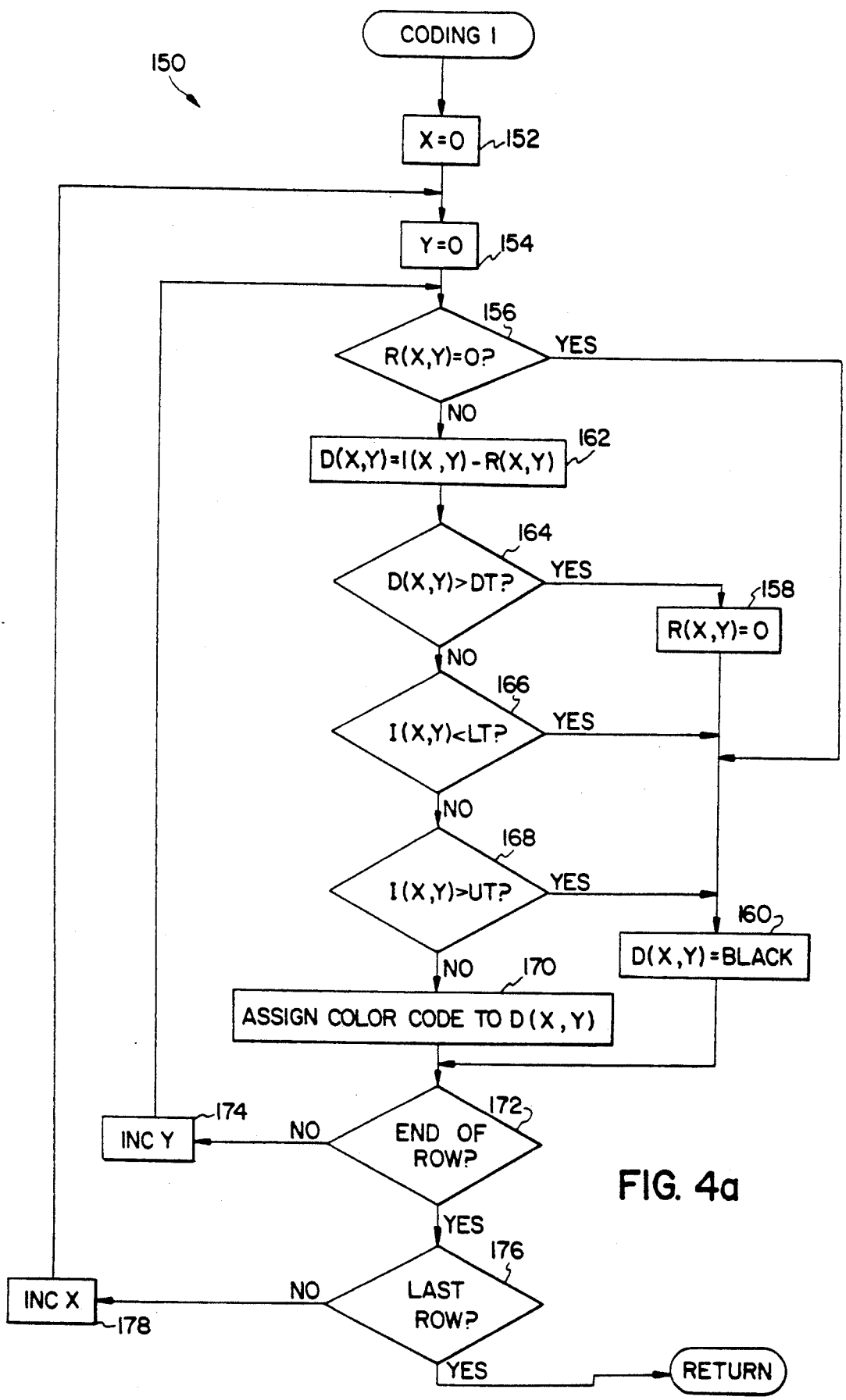
FIG. 4a is a flow chart of a first color coding routine 150 which may be utilized during the step 68 of the flow chart of FIG. 2.

A flow chart of a first color coding subroutine 150, CODING I, which may be called during step 68 of FIG. 2 is shown in FIG. 4a. This subroutine 150 generates color image data comprising a particular color code for each X, Y portion of a scan. The image data is generated successively for each X, Y portion of a scan, with X and Y being periodically incremented so that image data is generated for each X, Y portion of the image to be displayed. Now referring to FIG. 4a, at step 152 the value of the variable X is set to zero and at step 154 the value of the variable Y is set to zero so that during the first execution of the steps 156–170 the scan data I(O, O) is analyzed and the color image data C(O, O) is generated.

One feature of the invention is a blanking feature which causes certain areas of the colorized image that is to be displayed to be blanked out. The portions that are blanked out are those portions for which the change in the scan number from the reference scan to a subsequent scan exceeds a predetermined difference. These areas are blanked out because they do not contain useful information concerning flow perfusion. For example, when heart tissue is being scanned for purposes of determining myocardial perfusion, the heart cavity is of no interest since the blood flow within the heart tissue, and not the blood flow through the heart cavity, is important. In this case, the heart cavity will be blanked out. The blanking out of these certain areas is accomplished by assigning those areas the "color" black. For purposes of the present description, black will be referred to as a color even though it is the absence of color. The blanking feature could also be achieved by assigning these areas another color besides black, such as gray or white.

At step 156, the value of the scan number of the reference scan at the current X, Y position, R(X, Y), is tested to determine whether it is equal to zero. As described above, the range of scan numbers generated by the reconstructor 22 varies from zero to 2,048. However, the value of the scan number will almost never be zero since any type of tissue, or bone, will generate scan numbers substantially above zero. For example, heart tissue will generate scan numbers in the general range of 980–1,050, and lung tissue will generate scan numbers in the general range of 300–800. The only case in which R(X, Y) will equal zero is if it has been previously set to zero at step 158 because that area of the image is to be blanked out in accordance with the blanking feature of the invention. If R(X, Y) is zero as determined at step 156, then that X, Y area is to be blanked out, and the program branches to step 160 at which point the value of C(X, Y) is set to black. As described above, C(X, Y) represents a two-dimensional array which stores the color codes that are assigned to each X, Y portion of the image to be displayed.

If the value of R(X, Y) was not equal to zero as determined at step 156, then the program branches to step 162 where the value of R(X, Y) is subtracted from the value of I(X, Y) and the result stored in the variable D(X, Y). Step 162 thus acts as a difference means or subtracter. R(X, Y) represents the scan number at the X, Y portion of the reference scan, and I(X, Y) represents the scan number at the X, Y portion of the scan for which image data is currently being generated, or "current scan." Since the value of R(X, Y) is generally proportional to the amount of blood present at that X, Y portion of the reference scan and I(X, Y) is generally proportional to the amount of blood present at the same X, Y portion of the current scan, the difference in those two values, or scan number difference D(X, Y), is generally proportional to the blood flow through that X, Y portion of tissue during the time period between the reference scan and the current scan.

At step 164, the value of the scan number difference, D(X, Y), is compared with a predetermined scan number difference, DT. The value of DT is either the predetermined difference that was entered by the operator during one of the select parameters routines 80, 90, or 120, or is the default value, which is equal to 50. If the value of D(X, Y) is greater than DT, then that X, Y area of the image is to be blanked out, and the program branches to step 158 where the value of R(X, Y) is set to zero and to step 160 where the value of C(X, Y) is assigned the color black. It should be noted that once an X, Y portion of the image is blanked out by setting R(X, Y) equal to zero, it stays blanked out since R(X, Y) will always be equal to zero thereafter.

If the value of D(X, Y) is not greater than DT, the program branches to step 166. Steps 166, 168 determine whether the scan number for the X, Y portion of the current scan is within a predetermined range. The predetermined range is defined by a lower limit LT and an upper limit UT. These limits may be set by the operator during the select parameters routines 80, 90, 120. The default values of LT and UT are 1,000 and 1,200, respectively. These default values are designed for images of heart tissue, which as indicated above, produces scan numbers generally within the range 980–1,050. If the visual display of infarctions is desired, the lower threshold LT may be selected to be 980 or less.

Any X, Y portions of the current scan that have scan numbers within this predetermined range are considered relevant and are colorized, whereas any X, Y portions having a scan number outside this range are deemed irrelevant, and are blanked out by assignment of the color black. Accordingly, at step 166, if the scan number of the X, Y portion of the current scan, I(X, Y), is less than the lower threshold LT, then the program branches to step 160 where that X, Y portion is assigned the color black.

If the value of I(X, Y) is greater than the lower threshold LT, the program branches to step 168 where the scan number of the current scan, I(X, Y), is compared to the upper threshold UT. If the value of I(X, Y) is larger than UT, then the X, Y portion is to step 160 where that X, Y portion is assigned the color black. If the value of I(X, Y) is not greater than UT, then the value is within the range of interest, and the program branches to step 170 where a color code, C(X, Y), is assigned to the X, Y portion. The manner in which the color code is assigned is described in more detail in connection with FIGS. 6 and 7.

Steps 156–170 described above are performed for each X, Y position of the scan, the value of Y being periodically incremented until the end of a horizontal row is reached. When, the end of a row is reached, the value of Y is reset to zero and the value of X is incremented so that the next row of X, Y scan portions will be analyzed. Accordingly, at step 172, the program determines whether the end of the row has been reached. If the end of the row has not been reached, the program simply branches to step 174 where the value of Y is incremented so that the scan numbers of the next X, Y portion of the scan will be analyzed. If the end of the row has been reached, the program branches to step 176 where the value of X is tested to determine whether the last row has been reached. If the last row has not been reached, the program branches to step 178 where the value of X is incremented so that the next row of X, Y scan portions will be analyzed. The program then branches to TM step 150 where the value of Y is reset to zero so that the X, Y scan portion at the beginning of the row will be analyzed. As indicated above, the colorized image to be generated may have a length of 100 pixels and a width of 100 pixels. If each X, Y portion corresponded to a single pixel of the color display 34, then steps 156-170 would be repeated until X and Y both equalled 99.

If the last row has been completed as determined at step 176, then all of the X, Y scan portions of the scan for which color image data is being generated have been analyzed, and the program returns to step 70 of FIG. 2 where the color image data array C(X, Y) is stored in the memory 36 of the controller 30.

Figure 4B:
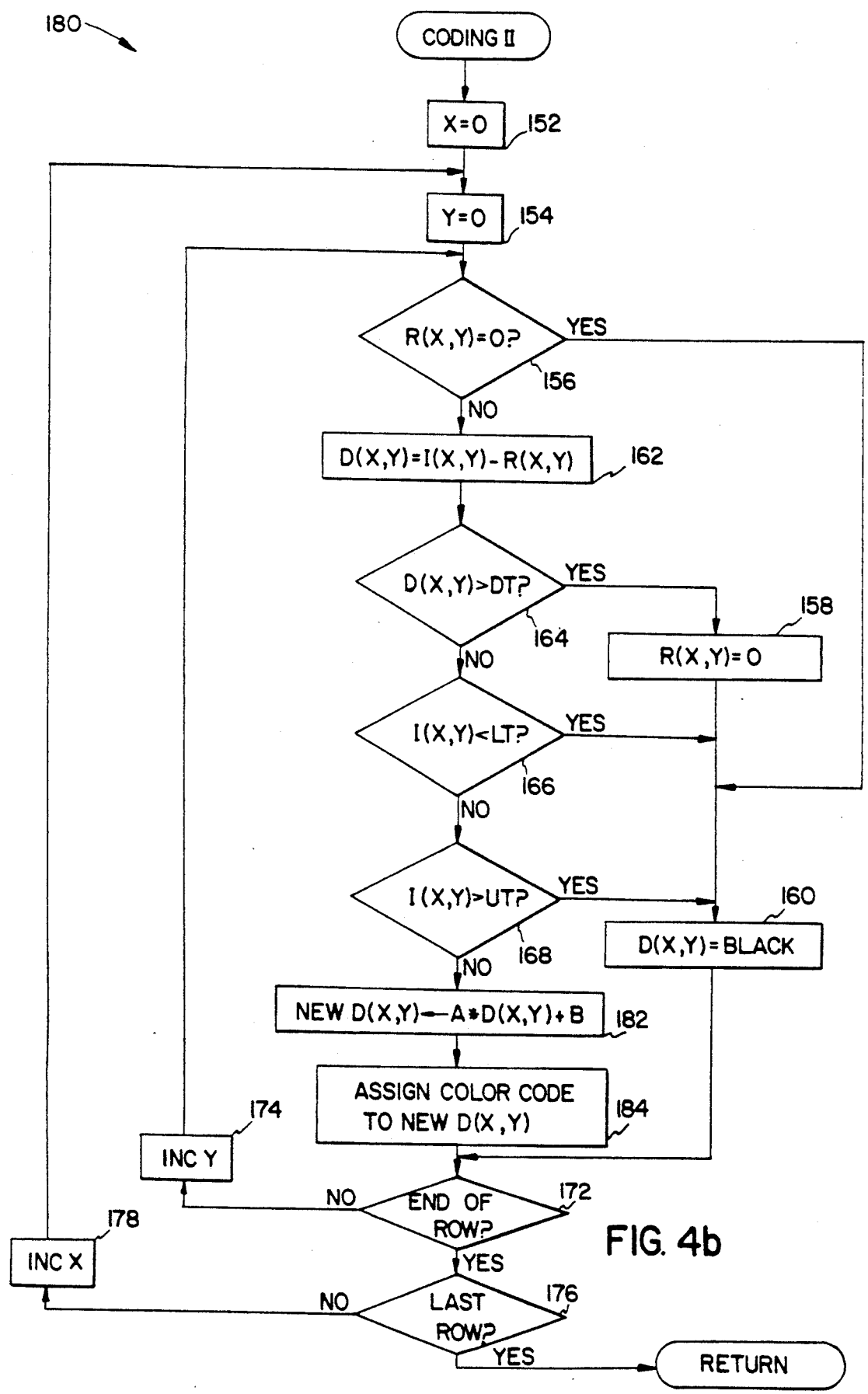
FIG. 4b is a flow chart of a second color coding routine 180 which may be utilized during the step 68 of the flow chart of FIG. 2.

A second color coding algorithm 180, CODING II, is shown in FIG. 4b. This algorithm 180 is substantially the same as the first algorithm 150 described above in connection with FIG. 4a, except that there is an additional step in FIG. 4b which gives the operator flexibility as to how images are colorized. The steps of FIG. 4b that are identical to the steps of FIG. 4a are designated with the same numerals, and the description of these steps is set forth above in connection with FIG. 4a.

Now referring to FIG. 4b, the second coding algorithm 180 includes an additional step 182 after step 168. Step 182 determines a, new value, NEW D(X, Y), based upon the D(X, Y) value that was determined in step 162. NEW D(X, Y) is set equal to A * D(X, Y)+B. As described above, the values of A and B may be selected by the operator during the PARAMETERS II routine 90. The variable A is a scaling factor and the variable B is an offset factor. By selecting various values of A and B, the operator may customize the assignment of color codes based upon the scan number difference, D(X, Y). For example, selecting a value of A greater than one would increase the sensitivity of the color coding scheme because a smaller scan number difference would be required to produce the same image color. Selecting a value of A less than one would decrease the sensitivity since a greater scan number difference would be required to produce the same image color. At step 184, a color code is assigned based upon the new value of the scan number difference, NEW D(X, Y).

Figure 4C:
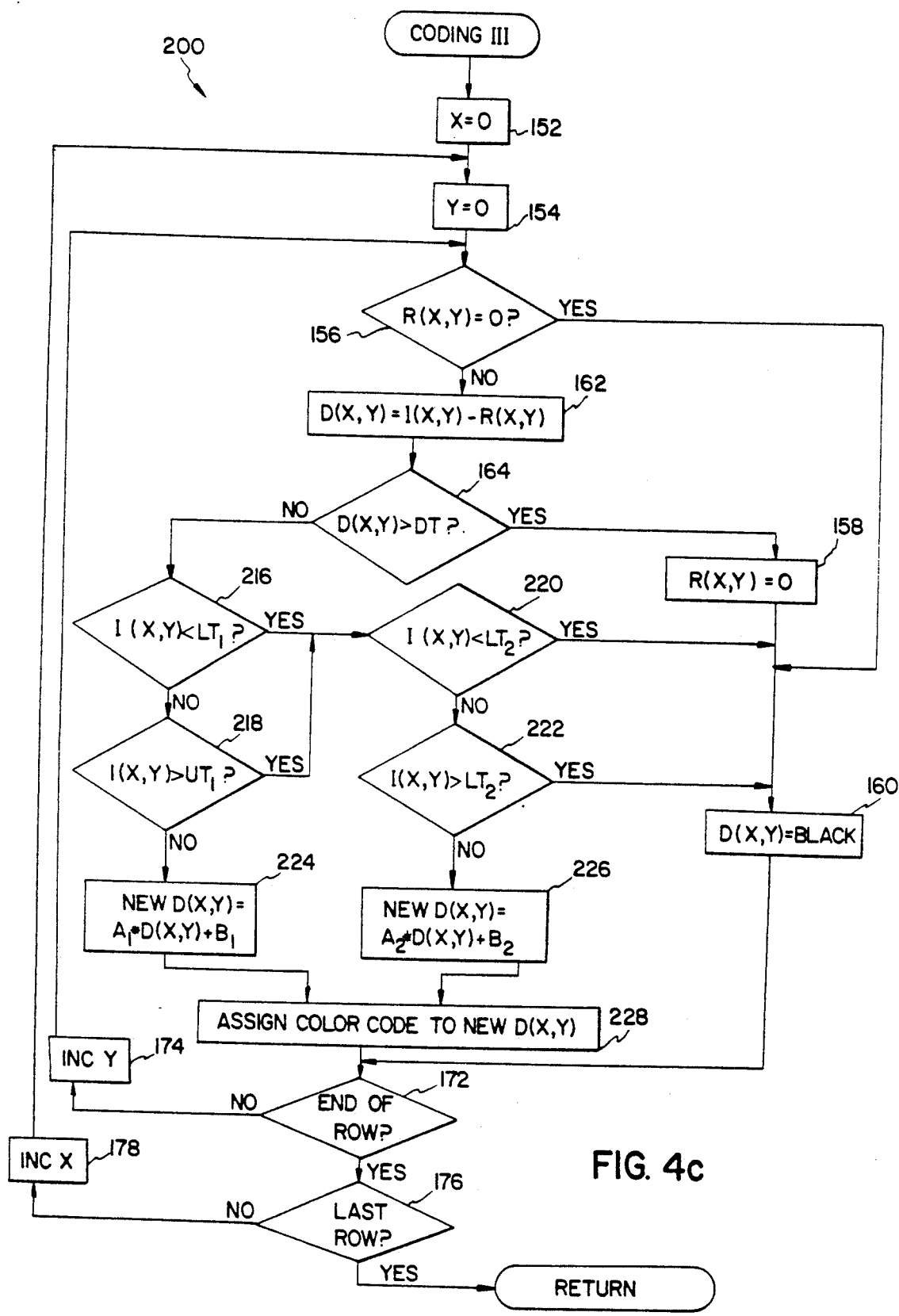
FIG. 4c is a flow chart of a third color coding routine 200 which may be utilized during the step 68 of the flow chart of FIG. 2.

A third color coding algorithm 200, CODING III, is shown in FIG. 4c. This algorithm 200 is substantially the same as the first algorithm 150 described above in connection with FIG. 4a, except instead of generating color image data for scan numbers within a single range as in FIG. 4a, the algorithm 200 generates color image data for scan numbers that are within two separate ranges. The steps of FIG. 4c that are identical to the steps of FIG. 4a are designated with the same numerals, and the description of these steps is set forth above in connection with FIG. 4a.

Now referring to step 164 of FIG. 4c, if the scan number difference for the current X, Y scan portion, D(X, Y), is not larger than the predetermined difference DT, then the program branches to step 216. Steps 216-228 cause color image data to be generated if the scan number for the current scan, I(X, Y), is within a first predetermined range having a lower threshold of $LT_1$ and an upper threshold of $UT_1$ This first predetermined range may be the range corresponding to heart tissue, for example. The default values for $LT_1$ and $UT_1$ are 1,000 and 1,200, respectively. At step 216, the program determines if the current scan number, I(X, Y), is less than the lower threshold, $LT_1$. If it is, meaning that the scan number is not within the first range, then the program branches to step 220. If it is not less than the lower threshold $LT_1$, then the program branches to step 218, where the scan number, I(X, Y), is tested to determine whether it is larger than the upper threshold, $UT_1$. If it is, meaning that the scan number is not within the first range, then the program branches to step 220. If it is not, then the scan number is within the first-range, and the program branches to step 224 where, as in step 182 described above in connection with FIG. 4b, a new scan number difference, NEW D(X, Y), is determined based upon the scan number difference D(X, Y) and the variables $A_1$ and $B_1$. The values of $A_1$ and $B_1$ may be selected by the operator if the select parameters routine 120 described above is used. The program then branches to step 228 where a color code is assigned to the X, Y portion based upon the new scan number difference, NEW D(X, Y).

If the scan number I(X, Y) was not within the first range as determined at steps 216 and 218, the program will have branched to step 220. Steps 220-228 cause color image data to be generated if the scan number for the current scan, I(X, Y), is within a second predetermined range having a lower threshold of $LT_2$ and an upper threshold of $UT_2$ This second predetermined range may be the range corresponding to lung tissue, for example. The default values for $LT_2$ and $UT_2$ are 100 and 950, respectively. At step 220, the program determines if the current scan number, I(X, Y), is less than the lower threshold, $LT_2$. If it is, meaning that the scan number is not within the second range, then the program branches to step 160 where the X, Y portion is assigned the color black since it is not within either of the two ranges for which color image data is generated. If I(X, Y) is not less than the lower threshold $LT_2$, the program branches to step 222, where I(X, Y) is tested to determine whether it is greater than the upper threshold $UT_2$. If it is, meaning that the scan number is not within the second range, then the program branches to step 160 where the X, Y portion is assigned the color black since it is not within either of the two ranges. If I(X, Y) is not greater than $UT_2$, then the scan number is within the second range, and the program branches to step 226 where, as in step 182 described above in connection with FIG. 4b, a new scan number difference, NEW D(X, Y), is determined based upon the scan number difference D(X, Y) and the variables $A_2$ and $B_2$. The program then branches to step 228 where a color code is assigned to the X, Y portion based upon the new scan number difference, NEW D(X, Y).

COLOR CODE ASSIGNMENT

Figure 6:
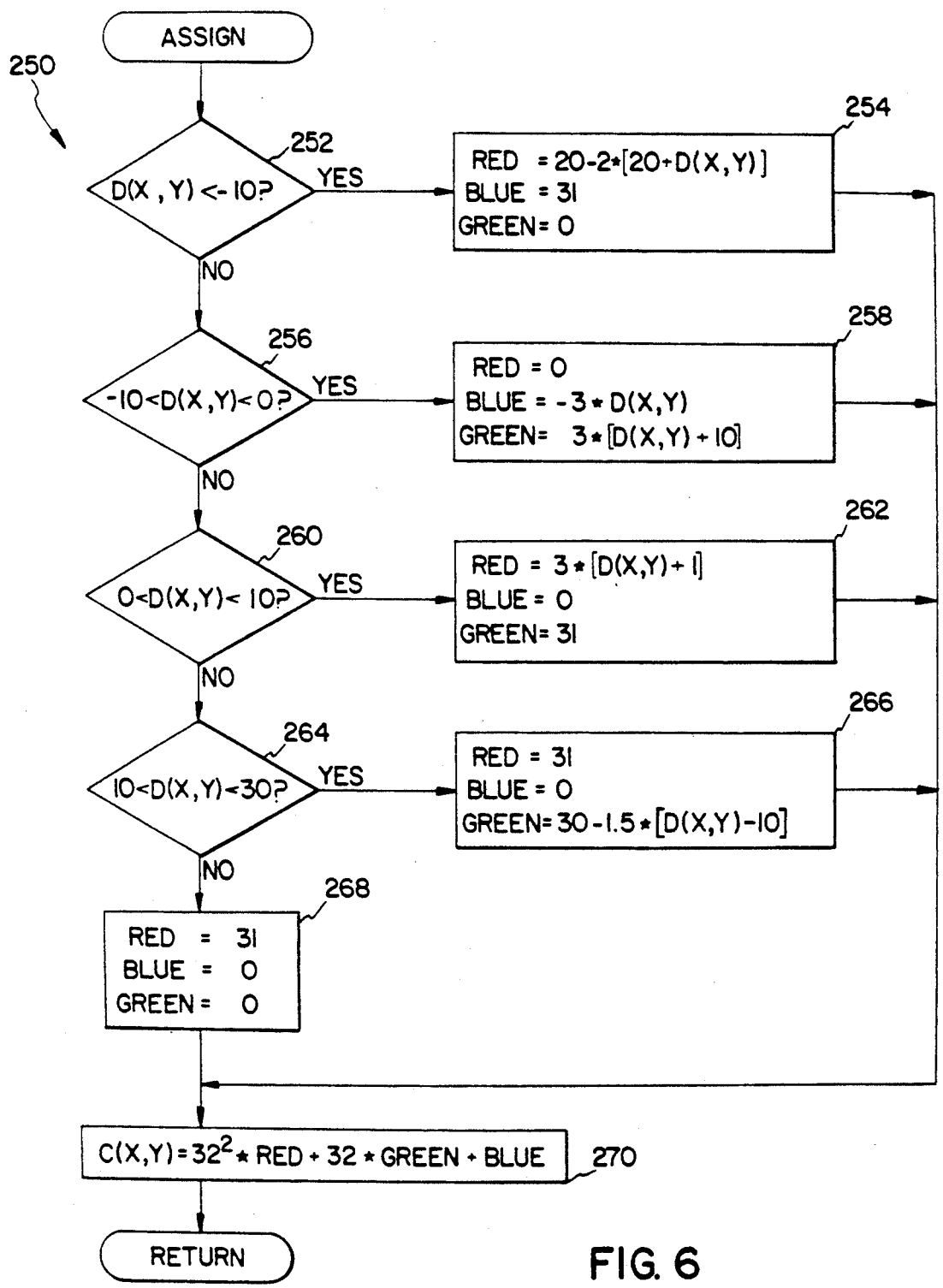
FIG. 6 is a flow chart of a color code assignment routine 250 which may be used in a preferred embodiment of the invention.

One method of assigning a color code to an X, Y portion is shown in FIG. 6, which is a flow chart of a subroutine 250, ASSIGN, that determines a 15-bit binary color code that is to be stored in each position of the C(X, Y) array. The 5-bit color code is generated based upon three variables, RED, BLUE, and GREEN, each of which stores a 5-bit binary color code representing the intensity of the primary colors red, blue, and green, respectively. The values of RED, BLUE, and GREEN are assigned based upon the value of the scan number difference, D(X, Y). This subroutine 250 is executed during step 172 of one of the FIGS. 4a, 4b, or 4c.

Now referring to FIG. 6, at step 252 the program determines whether the current scan number difference, D(X, Y), is less than −10. If it is, the program branches to step 254 at which point the value of the RED variable is set equal to 20−2 * [20+D(X, Y)], and the BLUE and GREEN variables are set equal to 31 and 0, respectively. The program then branches to step 270.

If the current scan number difference was not within the first range as determined at step 252, the program branches to step 256 where the program determines whether D(X, Y) is between −10 and zero. If it is, then the program branches to step 258 at which point the value of RED is set to zero, the value of BLUE is set to −3 times the value of D(X, Y), and the value of GREEN is set to 3* [D(X, Y)+10]. The program then branches to step 270.

If the current scan number difference was not within the second range as determined at step 256, the program branches to step 260 where the program determines whether D(X, Y) is between zero and +10. If it is, then the program branches to step 262 at which point the value of RED is set equal to 3* [D(X, Y)+1], and the values of BLUE and GREEN are set to 0 and 31, respectively. The program then branches to step 270.

If the current scan number difference was not within the third range as determined at step 260, the program branches to step 264 where the program determines whether D(X, Y) is between +10 and +30. If it is, then the program branches to step 266 at which point the value of RED is set to 31, the value of BLUE is set to zero, and the value of GREEN is set to 30−1.5* [D(X, Y) −10]. The program then branches to step 270.

If the current scan number difference was not within the fourth range as determined at step 264, the difference must be greater than +30, and the program branches to step 268 where RED, BLUE, and GREEN are set to 31, 0, and 0, respectively. The program then branches to step 270.

At step 270, the 15-bit binary color code described above is determined based upon the three 5-bit binary values determined for RED, BLUE, and GREEN. Essentially, the 15-bit color code is generated by simply concatenating the three 5-bit codes together, with the 5-bit color code for RED occupying the most significant five bits, the code for GREEN occupying the middle five bits, and the code for BLUE occupying the least significant five bits. This concatenation is accomplished by assigning the 15-bit color code, C(X, Y), the value of 322* RED+32* GREEN+BLUE. The binary representation of C(X, Y) is equivalent to a 10-bit logical left shift of the five RED bits and a 5-bit logical left shift of the five GREEN bits, with the five BLUE bits occupying the five least significant bits. After the completion of step 270, the subroutine ends and the program resumes execution at step 172 of one of the routines shown in FIGS. 4a, 4b or 4c.

Instead of assigning the color codes based upon the routine of FIG. 6, an alternative method of assigning the color codes may be used. The color codes may be stored in a look-up table stored in the read-only memory (ROM) 38 in the controller 30. A portion of such a look-up table 300 is shown in FIG. 7. For each scan number difference, D(X, Y), in the table 300, an associated color code, C(X, Y) would be stored. For example, for a scan number difference of −10, the color code $C_{-10}$ would be stored. $C_{-10}$ could be either a 15-bit color code specifying a single color or three separate color codes for red, blue, or green. The structure of the look-up table could be varied in many ways. One advantage of using a look-up table would be that the time necessary for assigning the color code would be reduced, since accessing a single memory location is faster than executing a subroutine of the type shown in FIG. 6.

Many modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. An imaging system for producing colorized images based upon the distribution of blood flow within a portion of a living body, said imaging system comprising:
   scanning means for performing a plurality of successive scans of a portion of a living body to generate a set of scan data for each of said scans, each set of scan data comprising a scan number for each of a plurality of X, Y portions of each scan;
   memory means for storing the scan data generated by said scanning means;
   difference means coupled to said memory means for determining the difference between the scan number generated for each X, Y portion of one of said scans with the scan number generated for each corresponding X, Y portion of another of said scans;
   display means for displaying a color image; and
   means for generating color image data by assigning a color code to each of a plurality of X, Y portions of a color image to be displayed on said display means based upon the differences in said scan numbers determined by said difference means.

2. An imaging system as defined in claim 1 wherein said scanning means comprises a CT scanner.

3. An imaging system as defined in claim 1 wherein said display means comprises a cathode ray tube.

4. An imaging system as defined in claim 1 wherein said display means comprises a cathode ray tube and wherein each of said X, Y portions of said display means comprises a pixel of said cathode ray tube.

5. An imaging system for producing colorized images based upon the distribution of blood flow within a portion of a living body, said imaging system comprising:
   memory means for storing a set of scan data for each of a plurality of successive scans of a portion of a living body, each said set of scan data comprising a scan number for each of a plurality of X, Y portions of one of said scans;
   difference means coupled to said memory means for determining the difference between the scan number generated for each X, Y portion of one of said scans with the scan number generated for each corresponding X, Y portion of another of said scans;

display means for displaying a color image; and means for generating color image data by assigning a color code to each of a plurality of X, Y portions of a color image to be displayed on said display means based upon the differences in said scan numbers determined by said difference means.

6. An imaging system comprising:

a scanner that performs a plurality of successive scans of a portion of a living body, said scanner generating scan data for each of said scans, said scan data comprising a scan number for each of a plurality of X, Y portions of said scans;

a controller coupled to said scanner, said controller comprising:
 a subtracter that determines the difference between the scan number generated for each X, Y portion of one of said scans with the scan number generated for each corresponding X, Y portion of another of said scans; and
 a color image data generator coupled to said subtracter that produces color image data based upon said differences as determined by said subtracter, said color image data including a color code for each X, Y portion of an image to be displayed; and a display coupled to said controller that displays a colorized image based upon said color image data.

7. An imaging system comprising:

a scanner that performs a plurality of successive scans of a portion of a living body, said scanner generating scan data for each of said scans, said scan data comprising a scan number for each of a plurality of X, Y portions of said scans;

a memory for storing said scan data;

a subtracter coupled to said memory that determines the difference between the scan number generated for each X, Y portion of one of said scans with the scan number generated for each corresponding X, Y portion of another of said scans;

a color image data generator coupled to said subtracter that produces color image data, based upon said differences as determined by said subtracter, said color image data including a color code for each X, Y portion of an image to be displayed; and a display coupled to said image generator that displays a colorized image based upon said color image data.

8. An imaging system comprising:

a memory that stores a set of scan data for each of a plurality of successive scans of a portion of a living body, each said set of scan data comprising a scan number for each of a plurality of portions of one of said scans;

a subtracter coupled to said memory that determines the difference between the scan number generated for each portion of one of said scans with the scan number generated for each corresponding portion of another of said scans;

a color image data generator coupled to said subtracter that produces color image data based upon the differences determined by said subtractor, said color image data including a color code for each portion of an image to be displayed; and a display coupled to said color image data generator that displays a colorized image based upon said color image data.

9. An imaging system for producing colorized images based upon the distribution of blood flow within a portion of a living body, said imaging system comprising:

scanning means for performing a plurality of successive scans of a portion of a living body to generate a set of scan data for each of said scans, each set of scan data comprising a scan number for each of a plurality of X, Y portions of each scan;

memory means for storing the scan data generated by said scanning means;

difference means coupled to said memory means for determining a scan number difference, said difference being the difference between the scan number generated for an X, Y portion of one of said scans with the scan number generated for a corresponding X, Y portion of another of said scans;

image blanking means coupled to said difference means for assigning a predetermined color code to an X, Y portion of one of said scans having a scan number difference that exceeds a predetermined threshold;

display means for displaying an image;

assigning means for assigning color codes to a plurality of X, Y portions of said display means based upon the differences in said scan numbers determined by said difference means; and means for generating a colorized image of the living body portion based upon said color codes assigned by said assigning means.

10. An imaging system as defined in claim 9 wherein said predetermined color code assigned by said blanking means is a color code representing the color black.

11. A method of imaging comprising the steps of:

(a) performing a plurality of successive scans of a portion of a living body to generate scan data, said scan data comprising a scan number for each of a plurality of X, Y portions of each scan;

(b) determining the difference between a scan number for an X, Y portion of one of said scans and a scan number corresponding to the same X, Y portion of another one of said scans;

(c) assigning a color code to said X, Y portion of said scan based upon the difference determined in said step (b);

(d) repeating said steps (b) and (c) for a plurality of X, Y portions of said scans; and (e) displaying an image of the living body portion based upon the color codes assigned in said step (c).

12. An imaging system as defined in claim 11 wherein the image of the living body portion is displayed on a cathode ray tube and each of said X, Y portions corresponds to a single pixel of the cathode ray tube.

13. A method of imaging comprising the steps of:

(a) determining the difference between a scan number for a portion of a first scan of a portion of a living body and a scan number corresponding to the same portion of a second scan of the same portion of the living body;

(b) assigning a color code to said portion of said scans based upon the difference determined in said step (a);

(c) repeating said steps (a) and (b) for a plurality of portions of said scans; and (d) displaying an image of the living body portion based upon the color codes assigned in said step (b).

14. A method of imaging comprising the steps of:

(a) performing a plurality of successive scans of a portion of a living body to generate scan data, said scan data comprising a scan number for each of a plurality of X, Y portions of each scan;

(b) determining the difference between a scan number for an X, Y portion of one of said scans and a scan number corresponding to the same X, Y portion of another one of said scans;

(c) comparing a scan number difference corresponding to one of said X, Y scan portions determined in said step (b) with a predetermined threshold;

(d) causing the X, Y scan portion of step (c) to be blanked out if said scan number difference is greater than a predetermined threshold as determined in said step (c);

(e) assigning a color code to said X, Y portion of said scan based upon the difference determined in said step (b);

(f) repeating said steps (b) through (e) for a plurality of X, Y portions of said scans; and (g) generating an image of the living body portion based upon the color codes assigned in said step (e).

15. A method as defined in claim 14 wherein the X, Y scan portion blanked out in said step (d) is blanked out by assigning a color code representing the color black to that portion.

16. A method of imaging comprising the steps of:
(a) performing a plurality of successive scans of a portion of a living body to generate scan data, said scan data comprising a scan number for each of a plurality of X, Y portions of each scan;

(b) determining the difference between a scan number for an X, Y portion of one of said scans and a scan number corresponding to the same X, Y portion of another one of said scans;

(c) comparing the scan number difference corresponding to one of said X, Y scan portions determined in said step (b) with a predetermined difference;

(d) causing the X, Y scan portion of step (c) to be blanked out if said scan number difference is greater than said predetermined difference;

(e) comparing the scan number for one of said X, Y scan portions with a first predetermined threshold;

(f) causing the X, Y scan portion of said step (e) to be blanked out if the scan number for said X, Y portion is less than said first predetermined threshold;

(g) comparing scan number for one of said X, Y portions with a second predetermined threshold;

(h) causing the X, Y scan portion of said step (g) to be blanked out if the scan number for said X, Y portion is greater than said second predetermined threshold;

(i) assigning a color code to a plurality of X, Y portions of said scan based upon the difference determined in said step (b);

(j) repeating said steps (b) through (i) for a plurality of X, Y portions of said scans; and (k) generating an image of the living body portion based upon the color codes assigned in said step (i).

17. An imaging system for producing colorized images based upon the distribution of blood flow within a portion of a living body, said imaging system comprising:

scanning means for performing a plurality of successive scans of a portion of a living body to generate a set of scan data for each of said scans, each set of scan data comprising a scan number for each of a plurality of X, Y, portions of each scan;

memory means for storing the scan data generated by said scanning means;

difference means coupled to said memory means for determining the difference between the scan number generated for each X, Y portion of one of said scans with the scan number generated for each corresponding X, Y portion of another of said scans;

display means for displaying a color image;

means for generating color image data by assigning a color code to each of a plurality of X, Y portions of a color image to be displayed on said display means based upon the differences in said scan numbers determined by said difference means; and image blanking means for assigning a predetermined color code to an X, Y portion of one of said scans having a scan number difference that exceeds a predetermined threshold.

18. An imaging system as defined in claim 17 wherein said predetermined color code is not changed once it is assigned by said image blanking means so if a portion of an image is blanked out, it remains blanked out thereafter.

19. An imaging system as defined in claim 18 wherein said predetermined color code corresponds to the color black.

20. A method of imaging comprising the steps of:
(a) performing a plurality of successive scans of a portion of a living body to generate scan data, said scan data comprising a scan number for each of a plurality of X, Y portions of each scan;

(b) determining the difference between a scan number for an X, Y portion of one of said scans and a scan number corresponding to the same X, Y portion of another one of said scans;

(c) assigning a color code to said X, Y portion of said scan based upon the difference determined in said step (b);

(d) repeating said steps (b) and (c) for a plurality of X, Y portions of said scans; and (e) displaying an image of the living body portion based upon the color codes assigned in said step (c); and (f) permanently assigning a predetermined color code to an X, Y portion of one of said scans having a scan number difference that exceeds a predetermined threshold to blank out a portion of an image.

* * * * *

UNITED STATES PATENT AND TRADEMARK OFFICE
CERTIFICATE OF CORRECTION

PATENT NO. : 5,216,602

DATED : June 1, 1993

INVENTOR(S) : Wolfkiel, et al.

It is certified that error appears in the above-identified patent and that said Letters Patent is hereby corrected as shown below:

Col. 8, line 56, after "portion is", insert --outside the range of interest, and the program branches--.
 (Specification pg. 16, line 6)

Col. 9, line 14, omit "TM".
 (Specification pg. 16, line 32)

Col. 9, line 39, delete "," after the word "a".
 (Specification pg. 17, line 22)

Col. 11, line 2, "5-bit" should be --15-bit--.
 (Specification pg. 20, line 11)

Col. 11, line 59, "322" should be --$32^2$--.
 (Specification pg. 21, line 35)

Signed and Sealed this

Third Day of May, 1994

*Attest:*

BRUCE LEHMAN

*Attesting Officer*     *Commissioner of Patents and Trademarks*